A. H. GREENEBAUM.
SNAP FASTENER TOP.
APPLICATION FILED MAR. 26, 1913.
1,084,269.
Patented Jan. 13, 1914.
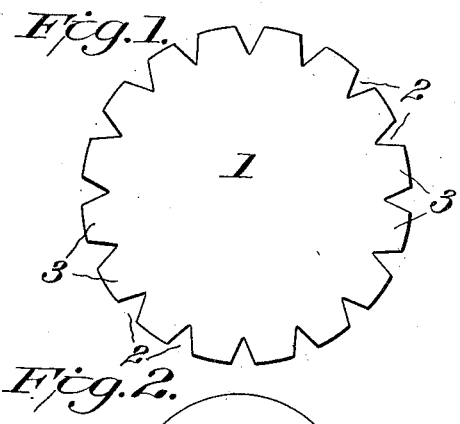
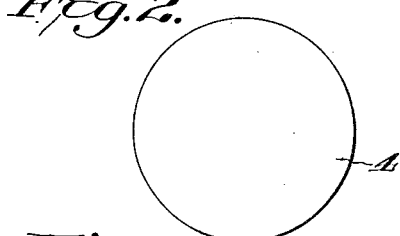
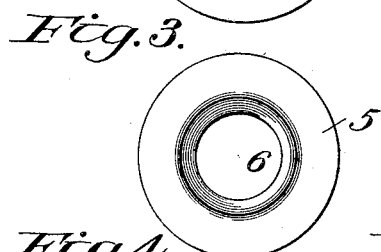
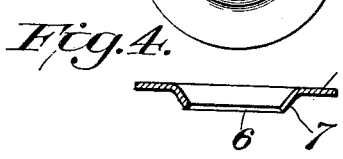
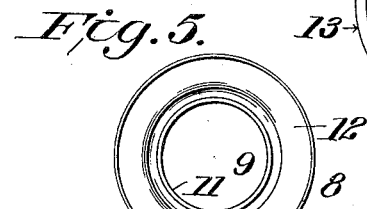
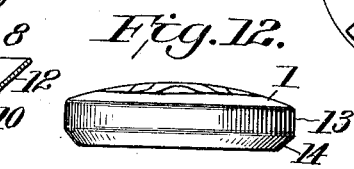
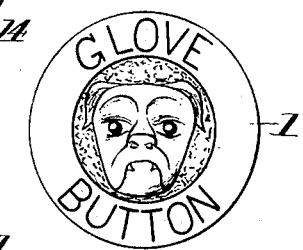
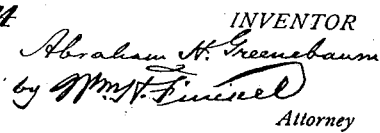
WITNESSES
INVENTOR
Abraham H. Greenebaum
by [Attorney signature]
Attorney

UNITED STATES PATENT OFFICE.

ABRAHAM H. GREENEBAUM, OF BALTIMORE, MARYLAND, ASSIGNOR TO ALMA MANUFACTURING COMPANY OF BALTIMORE CITY, OF BALTIMORE, MARYLAND, A CORPORATION OF MARYLAND.

SNAP-FASTENER TOP.

1,084,269.   Specification of Letters Patent.   Patented Jan. 13, 1914.

Application filed March 26, 1913.   Serial No. 757,031.

*To all whom it may concern:*

Be it known that I, ABRAHAM H. GREENEBAUM, a citizen of the United States, residing at Baltimore, in the State of Maryland, have invented a certain new and useful Improvement in Snap-Fastener Tops, of which the following is a full, clear, and exact description.

This invention is in the nature of an improvement on the invention of the Kerngood Patent No. 1,037,263, dated September 3, 1912. The invention of that patent enabled one to produce what might be appropriately designated, artificial horn buttons, or snap fastener tops. A present requirement, especially for such buttons or tops as are to be used on men's gloves, is that they shall be of considerable thickness or depth, so as to stand off rather prominently from the gloves. Genuine horn buttons or tops have vertically straight, square, or flat peripheries, with a bottom bevel or chamfer.

The object of the present invention is to produce an artificial horn button or top following these lines of the genuine.

The invention consists of an artificial horn button or top having a solid celluloid or other plastic cover shaped and embossed or ornamented *in situ* over a metal filler and closed in over a spreader or anvil and collet or back, so as to give to the finished article the desired thickness or depth and the angular periphery, as I will proceed now to explain and finally claim.

In the accompanying drawings illustrating the invention, in the several figures of which like parts are similarly designated, Figure 1 is a plan view of the plastic cover blank. Fig. 2 is a plan view of the metal filler. Fig. 3 is a top plan view, and Fig. 4 is a cross-section of the spreader or anvil. Fig. 5 is a top plan view, and Fig. 6 is a cross-section of the collet or back. Fig. 7 is an edge view of the plastic and filler blanks assembled and ready for the simultaneous impressing of the design and first folding of the cover, and Fig. 8 shows these parts thus treated. Fig. 9 is a cross-section showing the cover, filler, spreader and collet assembled, the cover being preliminarily folded over the collet or back. Fig. 10 is a cross-section of the finished button or top. Fig. 11 is a top plan view; Fig. 12 is a side or edge view and Fig. 13 is a bottom plan view of the finished button or top.

In the patent referred to, the use of the flanged metal shell to receive and hold the cover, renders it inconvenient to get the desired square or straight edge, but otherwise the process described in that patent may be followed in carrying out this invention. The fundamental difference between this present invention and the patented invention is that instead of the thin paper-backed or equivalent material used in the patented invention, tucked in under a flanged shell, I use a cover of homogeneous plastic material that may be softened by heat in the press used to shape it to the button or top, and a flat, unflanged disk of metal as a filling or backing merely. I prefer to use sheet celluloid because of its plasticity, variety of color, and the fact that it will retain its shape and location when set, and because of the additional fact that a cover of pronounced or considerable thickness may be used to receive and retain a design in high relief without liability of being broken or cut through by the dies or of cracking under the pressure necessary to impress and set it; and, finally, because it lends itself most readily to the production of buttons or tops of the desired thickness or depth and angular edge.

The cover 1, is made from a circular blank, of proper size, cut from sheet celluloid stock, and having its rim provided with notches 2 and intervening fingers 3, substantially as shown in Fig. 1, so that when this cover is closed in on the other constitutent parts of a button or top the edges of its fingers will abut and the material thus lie flat and smooth against the back of the button or top.

The filler or backing 4 is a disk of metal, of approximately the diameter of the finished button or top.

The spreader or anvil 5 is of metal and of usual form, having a central hole 6 surrounded by a frusto-conical portion 7. This spreader serves to deflect the leading end of the attaching eyelet, not shown.

The collet or back 8 is of metal, substantially frusto-conical in form, and having a central opening 9 enough larger than the adjacent part of the spreader to leave a space between the two for the entrance of the attaching eyelet, and having the rim of its hole beaded, as at 10, for strength and so as to revert its edge 11 and make a smooth finish; and also having the flange 12.

In the manufacture of buttons or tops from these elements, the filler 4 is placed in the die and the cover centered over it as in Fig. 7. Then, while exposed to heat sufficient to render the cover plastic, the cover is closed down over the filler, as shown in Fig. 8, and the filler and the top of the cover are convexed or otherwise shaped, and the design simultaneously impressed in both the filler and the cover, so that the metal filler reinforces and preserves the design in the plastic cover. Then the spreader or anvil 5 is placed within the down-turned edge of the cover, up against the filler, and the collet or back also placed next to the spreader, as shown in Fig. 9, and then the down-turned edge of the cover is turned under the back, as also indicated in Fig. 9. After this, and while the article is still exposed to heat sufficient to soften the cover for this and the previous operations, the edge of the cover is closed in flat against the collet or back, as shown in Fig. 13, so that the notches 2 are closed and the adjacent edges of the fingers 3 abutted to make a smooth and even finish; this inturning of the cover serving to unite the component parts of the button or top and firmly anchoring the cover in position. These operations of assembling the parts impart to the celluloid the desired polish or finish.

The edge of the button or top has a depth or thickness equal to the combined thickness of the filler, the spreader, the collet, and the cover repeated at top and bottom, or front and rear, and hence it is possible to simulate the genuine horn button or top in thickness or depth and also in edge finish. The periphery is straight or flat, as shown at 13 in Figs. 10 and 12, and it is capable of being beveled or chamfered, as at 14. As the finishing pressure is put upon the article, the collet or back has its flange portion 12 flattened out somewhat, as seen in Fig. 10, so that the beveling of the edge may be effected.

As already stated, and as indicated in Fig. 11, the use of a solid celluloid cover of pronounced or substantial thickness, when reinforced by the metal filler, admits of the formation in the top of the button of a design in rather high relief, and this design may be of rather intricate character and more or less ornamental, according to the fancy of the consumer or manufacturer. Thus it is possible to make the buttons or tops with the manufacturer's or consumer's trademark and name, or any advertisement.

Of course, such metal parts of a snap fastener top will be used as are necessary to adapt it to an attaching medium of the desired type; and inasmuch as these tops are usually attached by means of an eyelet, I have shown only that construction herein.

While the invention is designed primarily for snap fasteners, it is obvious that its principle is applicable to buttons or button tops of other types.

Other variations within the principle of the invention are permissible.

What I claim is:—

1. The herein described artificial horn top, consisting of a metal filler, a metal inner portion, a metal back portion, and a cover of solid plastic material embossed in position over and simultaneously with the metal filler and closed in over said metal parts and beneath the back and thereby secured in place and serving to unite the component parts of the top, the periphery of the thus covered top being of considerable depth and finished in angular lines.

2. An artificial horn top, having a metal filler, a metal spreader and a metal back arranged in edge contact one upon the other and thereby affording a substantial peripheral depth in the direction of the axis of the top, and a solid celluloid cover surmounting the filler and embossed in position with said filler, said cover having a rim inclosing the edges of the said metal parts and thence closed in under the back to unite the component parts of the top, the periphery of the thus built-up top being of a depth and angular finish simulating genuine horn tops and polished.

3. A top for snap fastener and other buttons, having a back, a spreader and a filler, and a cover of plastic material shaped and embossed in position over the filler and conjointly therewith and provided with a notched and fingered rim inclosing the edges of the back, spreader and filler and having its fingers engaging the back and butt-jointed thereon, said cover thus applied serving to unite inseparably the component parts of the top and affording in the finished article the desired finish, depth and peripheral angularity to simulate genuine horn tops.

4. A top for snap fastener and other buttons, having a collet or back, a spreader or anvil, and a filler, all of metal, of substantially the same diameter and laid one upon another, and a cover of plastic impressionable material provided with a notched and fingered rim folded about the metal parts with its fingers closed in on the back and butt-jointed and serving to unite the several parts, the substantial diametrical equality of the metal parts and the additional thicknesses of the cover at front and back giving an aggregate edge thickness which is polished and finished off at any desired angles to simulate genuine horn tops.

In testimony whereof I have hereunto set my hand this 25th day of March A. D. 1913.

ABRAHAM H. GREENEBAUM.

Witnesses:
NELLIE DOYLE,
HERMAN KERNGOOD.

Copies of this patent may be obtained for five cents each, by addressing the "Commissioner of Patents, Washington, D. C."